(12) United States Patent
Kovalchuk et al.

(10) Patent No.: US 12,345,137 B2
(45) Date of Patent: Jul. 1, 2025

(54) SWELLABLE DEVICES BASED ON RENEWABLE RAW MATERIALS AND METHODS OF USING IN WELLBORES

(71) Applicants: Anton Kovalchuk, Houston, TX (US); Anil Sadana, Houston, TX (US)

(72) Inventors: Anton Kovalchuk, Houston, TX (US); Anil Sadana, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 717 days.

(21) Appl. No.: 17/231,255

(22) Filed: Apr. 15, 2021

(65) Prior Publication Data

US 2021/0324713 A1 Oct. 21, 2021

Related U.S. Application Data

(60) Provisional application No. 63/010,217, filed on Apr. 15, 2020.

(51) Int. Cl.

| | |
|---|---|
| *E21B 43/10* | (2006.01) |
| *B01D 29/15* | (2006.01) |
| *B01D 39/16* | (2006.01) |
| *C08L 29/04* | (2006.01) |
| *C08L 31/02* | (2006.01) |
| *C08L 33/08* | (2006.01) |
| *C08L 97/02* | (2006.01) |
| *E21B 37/10* | (2006.01) |

(52) U.S. Cl.
CPC ............ *E21B 43/108* (2013.01); *B01D 29/15* (2013.01); *B01D 39/1676* (2013.01); *C08L 29/04* (2013.01); *C08L 31/02* (2013.01); *C08L 33/08* (2013.01); *C08L 97/02* (2013.01); *B01D 2239/10* (2013.01)

(58) Field of Classification Search
CPC .......... E21B 43/108; E21B 37/10; C09K 8/14
USPC ....................................................... 166/278
See application file for complete search history.

(56) References Cited

U.S. PATENT DOCUMENTS

| | | | | |
|---|---|---|---|---|
| 4,696,699 | A * | 9/1987 | Harriett ................... | C04B 28/26 106/632 |
| 5,114,893 | A * | 5/1992 | Hughes .................... | B01J 20/12 501/149 |
| 7,048,048 | B2 | 5/2006 | Nguyen et al. | |
| 7,059,415 | B2 * | 6/2006 | Bosma .................. | E21B 43/103 166/207 |
| 7,637,320 | B2 | 12/2009 | Howard et al. | |
| 8,181,708 | B2 * | 5/2012 | Korte ...................... | C08L 1/286 166/182 |
| 9,845,429 | B2 * | 12/2017 | Mahoney ............... | C09K 8/685 |

FOREIGN PATENT DOCUMENTS

RU  2480577 C1  4/2013

OTHER PUBLICATIONS

Baker Hughes; "GeoForm Conformable Sand Managment System Using Morphic Technology"; www.bakerhughes.com; May 2013, 2 pages.

* cited by examiner

*Primary Examiner* — Zakiya W Bates
*Assistant Examiner* — Ashish K Varma
(74) *Attorney, Agent, or Firm* — Baker Hughes Company

(57) ABSTRACT

An apparatus includes an expandable and porous filtration member having a body constructed of a composite containing a polymer hydrogel, a rubber binder, and a filler. The body has a first volume and expandable to a second volume upon contacting with a fluid comprising water.

23 Claims, 2 Drawing Sheets

SWELLABLE DEVICES BASED ON RENEWABLE RAW MATERIALS AND METHODS OF USING IN WELLBORES

CROSS REFERENCE TO RELATED APPLICATIONS

This application claims the benefit of an earlier filing date from U.S. Provisional Application Ser. No. 63/010,217 filed Apr. 15, 2020, the entire disclosure of which is incorporated herein by reference.

BACKGROUND

The disclosure is directed to swellable devices based on renewable raw materials and methods of using the swellable devices for sand control and well completion applications.

During well stimulation, completion, and production operations, clays, sand, micas, feldspars, plagioclase, or other fine particles may be generated. Fines may result from an unconsolidated or inherently unstable formation, or from the use of an incompatible treatment fluid that liberates fine particles. Other sources of fines include particulates added to the wellbore such as fines present in a proppant or produced from partially crushed proppant.

Once generated, formation fines may migrate toward the near wellbore area due to drag or other forces. The migrated fines can plug, erode or cause significant wear of downhole equipment and surface facilities. The fines can also plug or clog flow channels in the formation, thereby significantly reducing well productivity.

Fines migration can be controlled by injecting chemicals downhole to consolidate formation fines or by placing gravel packs or porous shape memory polymer filters downhole to filter fines out of the desired production fluid. Despite all the advances, there is a continuing need for alternative materials and methods to control fines migration.

BRIEF DESCRIPTION

An apparatus comprises an expandable and porous filtration member having a body constructed of a composite comprising a polymer hydrogel, a rubber binder, and a filler, wherein the body has a first volume and expandable to a second volume upon contacting with a fluid comprising water.

A method of producing fluid from a wellbore is disclosed. The method comprises: disposing an apparatus in a well penetrating a formation, the apparatus comprising a tubular member having a fluid flow passage, and an expandable and porous filtration member radially outwardly disposed of the tubular member, the expandable and porous filtration member having a body constructed of a composite comprising a polymer hydrogel, a filler; and a rubber binder; the body having a first volume and expandable to a second volume; expanding the expandable and porous filtration member towards the second volume; and filtering a fluid through the expanded filtration member to the tubular member.

A method of completing a wellbore comprises disposing an apparatus in a well penetrating a formation, the apparatus comprising a tubular member having a fluid flow passage, and an expandable and porous filtration member radially outwardly disposed of the tubular member, the expandable and porous filtration member having a body constructed of a composite comprising a polymer hydrogel, a filler; and a rubber binder; the body having a first volume and expandable to a second volume; expanding the expandable and porous filtration member towards the second volume; and conforming the expanded filtration member to a wellbore wall.

A method of manufacturing the expandable and porous filtration member as described above comprises mechanically blending the polymer hydrogel, the rubber binder, the filler, optionally a curing agent, and optionally an accelerator to form a blend; and casting the blend to form the expandable and porous filtration member.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
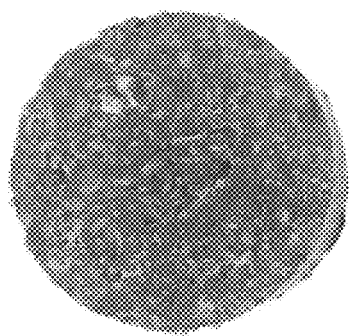
FIG. 1A shows a composite sample before swelling.
Figure 1B:
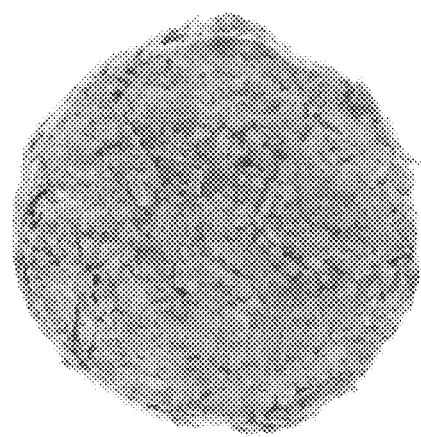
FIG. 1B shows the composite sample of FIG. 1A after swelling in 3% KCl solution for two days at 60° F.

It has been found that combining a rubber binder, a polymer hydrogel, and filler creates a unique composite that is elastic, lightweight, and can swell in an aqueous fluid up to 100% in volume. The swelling of the composite is illustrated in FIGS. 1A and 1B, where FIG. 1A shows a composite sample before swelling; and FIG. 1B shows the composite sample of FIG. 1A after swelling in 3% KCl solution for two days at 60° F.

Moreover, the composite can retain structural integrity after swelling. In addition, the filler comprises renewable raw materials, which are environmentally friendly, inexpensive, and/or widely available. The morphology of the filler can also be selected such that articles made from the composite are porous and can block fines such as sand particles but let fluid or gas phase to pass through.

With the discovery, it is possible to manufacture an apparatus comprising an expandable and porous filtration member having a body constructed of a composite comprising a polymer hydrogel, a rubber binder, and a filler. The body has a first volume and expandable to a second volume upon contacting with a fluid comprising water. As used herein, the first volume refers to the volume of the body that has not been exposed to a fluid containing water. Upon expansion, the body of the expandable filtration member can fill an annular space.

Advantageously, the filler comprises a renewable raw material. As used herein, a renewable raw material refers to a material of plant, animal, or microbial biomass. The filler can be in a number of formats, including a particle (e.g., a powder); fiber; strand; shavings; flakes; and the like; or a combination comprising at least one of the foregoing. The size of the filler is from 10 μm to 100,000 μm, specifically 50 μm to 10,000 μm, and more specifically 50 μm to 2000 μm. As used herein, "size" refers to the largest linear dimension, e.g., a diameter in a spherical particle. As specific examples, the filler comprises one or more of wood particles; wood strands; wood chips; wood flakes; wood shavings; walnut shell fragments; or corn cob fragments. Particles of the filler can be any shape including spherical; angular; and polyhedral. Preferably the filler has irregular shapes.

The filler is present in an amount of about 40 volume percent to about 70 volume percent or about 50 volume percent to about 70 volume percent based on the first volume of the body. Preferably the filler forms a porous mainframe providing most volume to the body of the filtration member and impart permeability to the body due to their morphology. The body of the expandable filtration member can also filter fluids that pass therethrough.

The rubber binder includes one or more of the following: an ethylene-propylene-diene monomer rubber (EPDM); a butadiene rubber; a styrene-butadiene rubber (SBR); a natural rubber; an acrylonitrile butadiene rubber; a styrene-butadiene-acrylonitrile resin; a nitrile butadiene rubber (NBR); a hydrogenated nitrile butadiene rubber (HNBR); a carboxylated nitrile butadiene rubber (XNBR); a carboxylated hydrogenated nitrile butadiene rubber (XHNBR); an amidated nitrile butadiene rubber (ANBR); a polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber. Preferably, before cure, the rubber binder is a liquid at room temperature.

In the body of the expandable and porous filtration member, the volume ratio between filler the rubber binder is about 10:1 to 7:1 or about 9:1 to about 8:1, making the filler the main component in the body of the filtration member by volume.

The rubber binder can be cured. Curing agents can be used to increase the efficiency of the cross-linking of the rubber binder during the curing process. The curing agents may include elemental sulfur and/or peroxides. Examples of peroxides include di(2,4-dichlorobenzoyl) peroxide; benzoyl peroxide; 1,1-bis(t-butylperoxy)-3,3,5-trimethyl cyclohexane; t-butyl perbenzoate; dicumyl peroxide (Di-Cup); di(t-butylperoxy)diisopropylbenzene (Vul-Cup); 2,5-dimethyl-2,5-di(t-butylperoxy)hexane; di-t-butyl peroxide; and 2,5-dimethyl-2,5-di(t-butylperoxy)hexyne. The curing agent can be used in amounts of about 0.1 to about 12 parts, or about 0.5 to 5 parts, or about 1 to 4 parts, per 100 parts or about by weight of the rubber binder.

Accelerators are optionally used to cure the rubber binder. Suitable accelerators are known to a person skilled in the art and include, for example, aldehyde amines; guanidines; thiazoles; sulfenamides; dithiocarbamates; thiuram sulfides; and xanthates. Examples of aldehyde amines include hexamethylene tetraamine and ethylidene aniline. Examples of guanidine include diphenyl guanidine; triphenyl guanidine; and di-o-tolyl guanidine. Examples of thiazoles include 2-mercaptobenzothiazole (MBT); 2,2'dithiobenzothiazole (MBTS); and 2,4-dinitrophenylmecaptobenzothiazole. Metal salts of mercaptobenzthiazole, such as a zinc or a sodium salt, may also be used as an organic accelerator. Examples of sulfenamides include N-cycolhexyl-2-benzothiazole sulfenamide (CBS); N-oxydiethylene-2-benzothiazole sulfenamide; N-t-butyl-2-benzothiazole sulfenamide (TBBS); N-dicyclohexylbenzothiazole-2-sulfenamide (DCBS); and 2-morpholinothiobenzothiazole (MBS). Examples of dithiocarbamates include piperidine pentamethylene and/or metal salts (e.g., zinc, sodium) of diethyl dithiocarbamates and ethyl phenyl dithiocarbamates; zinc dimethyldithiocarbamate (ZDMC); and zinc diethyldithiocarbamate (ZDEC). Examples of thiuram sulfides include tetramethyl thiuram disulfide (TMTD); tetraethyl thiuram disulfide; tetramethyl thiuram monosulfide (TMTM); and dipentamethylene thiuram tetrasulfate. Examples of xanthates include metal salts (e.g., zinc, sodium) of isopropyl xanthate and butyl xanthate. An amount of accelerator may range from about 0.1 to about 10 parts by weight or about 1 to about 3 parts by weight per 100 parts by weight of the rubber binder.

Activators may increase the efficiency of the accelerators used in the process of curing the rubber binder. In the presence of an accelerator-activator pair, an increase of curing rate, reduction of curing temperature and an increase of the mechanical properties of the produced rubber product may be observed. Activators may include, but are not limited to, metal oxides; fatty acids; metal salts; or a combination comprising at least one of the foregoing. Examples of metal oxides include zinc oxide; magnesium oxide; lead oxide; and tri-lead tetraoxide. Examples of fatty acids include steric acid; oleic acid; dibutyl ammonium oleate; palmitic acid; and linoleic acid. Examples of metal salts include zinc stearate; zinc palmate; zinc oleate; magnesium stearate; and magnesium oleate. An amount of activator may range from about 0.1 to about 5 parts by weight or about 0.5 to about 1.5 parts by weight per 100 parts by weight of the rubber binder.

As used herein, a "hydrogel" or "polymer hydrogel" refers to a crosslinked polymeric material which has three-dimensional polymer networks (i. e., polymer matrix), is insoluble in water, but can hold at least 10 percent by weight of water in its polymer matrix when it is fully hydrated.

The polymer hydrogel includes a repeating unit derived from one or more of an acrylate; an acrylic acid or a salt thereof; an acrylamide; a vinylpyrrolidone; a vinyl ester (e.g., a vinyl acetate); a vinyl alcohol; a 2-acrylamide-2-methylpropanesulfonic acid; or a derivative thereof.

The polymer hydrogel can include a plurality of cross-links among the polymer chains of the hydrogel. The cross-links can be covalent and result from crosslinking the polymer chains using a crosslinker. Examples of cross-linkers include a di(meth)acrylamide of a diamine such as a diacrylamide of piperazine, a $C_{1-8}$ alkylene bisacrylamide such as methylene bisacrylamide and ethylene bisacrylamide, an N-methylol compounds of an unsaturated amide such as N-methylol methacrylamide or N-methylol acrylamide, a (meth)acrylate esters of a di-, tri-, or tetrahydroxy compound such as ethylene glycol diacrylate, poly(ethyleneglycol) di(meth)acrylate, trimethylopropane tri(meth)acryl ate, ethoxylated trimethylol tri(meth)acrylate, glycerol tri(meth) acrylate), ethoxylated glycerol tri(meth)acrylate, pentaerythritol tetra(meth)acrylate, ethoxylated pentaerythritol tetra(meth)acrylate, butanediol di(meth)acrylate), a divinyl or diallyl compound such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, a diols polyol, hydroxyallyl or acrylate compounds, and allyl esters of phosphoric acid or phosphorous acid.

Non-limiting examples of polymer hydrogels include poly 2-hydroxyethyl acrylate; polyalkyl acrylate; polyacrylamide; poly methacrylamide; poly vinylpyrrolidone; poly vinyl acetate; polyacrylic acid; polyacrylic acid salt; or copolymers thereof. As a specific example, the polymer hydrogel is polyacrylamide having crosslinks that are polyethylene glycol diacrylate. As another specific example, the polymer hydrogel is a copolymer of acrylamide with, for example, maleic anhydride, vinyl acetate, ethylene oxide, ethylene glycol, acrylonitrile, or a combination thereof. Another specific example of polymer hydrogel is polyacrylamide having crosslinks that are polyethylene glycol diacrylate. In some embodiments, the polymer hydrogel is polyacrylic acid homopolymer or copolymer, wherein the crosslinks are vinyl ester oligomer. In an embodiment, the polymer hydrogel is a copolymer of acrylic acid and acrylate such as sodium acrylate having crosslinks, for example crosslinks derived from polyethylene glycol diacrylate. Sodium polyacrylate, acrylic acid/acrylamide copolymer or other polymer hydrogel such as crosslinked polyethylene oxide, starch grafted polyacrylonitrile, and the like can also be used.

The polymer hydrogel is present in an amount of about 10 to about 50 wt. %, preferably about 15 to about 35 wt. %, based on total weight of the composite material.

Figure 2:
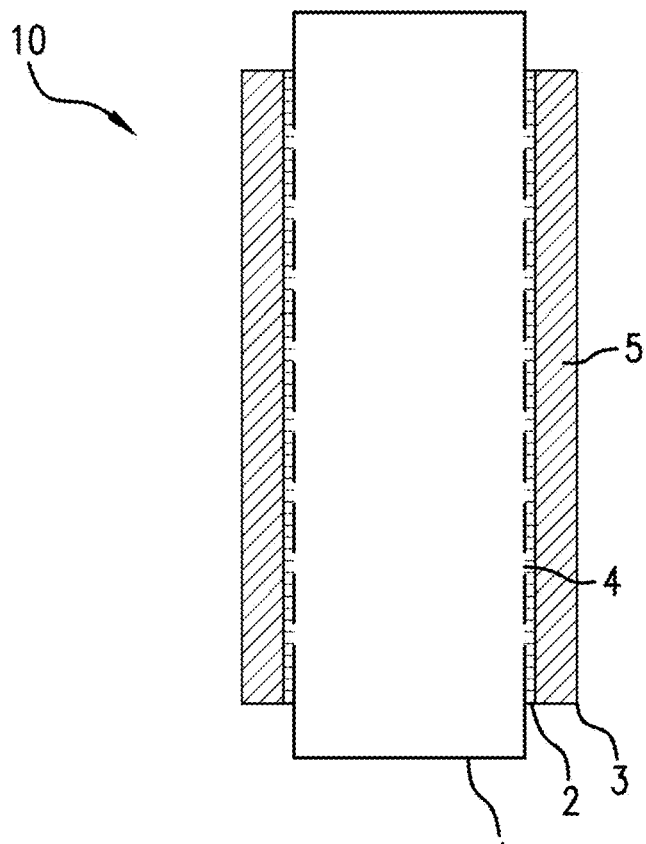
FIG. 2 illustrates an apparatus including a filtration member having a body constructed of a composite based on renewable raw materials.
Figure 3:
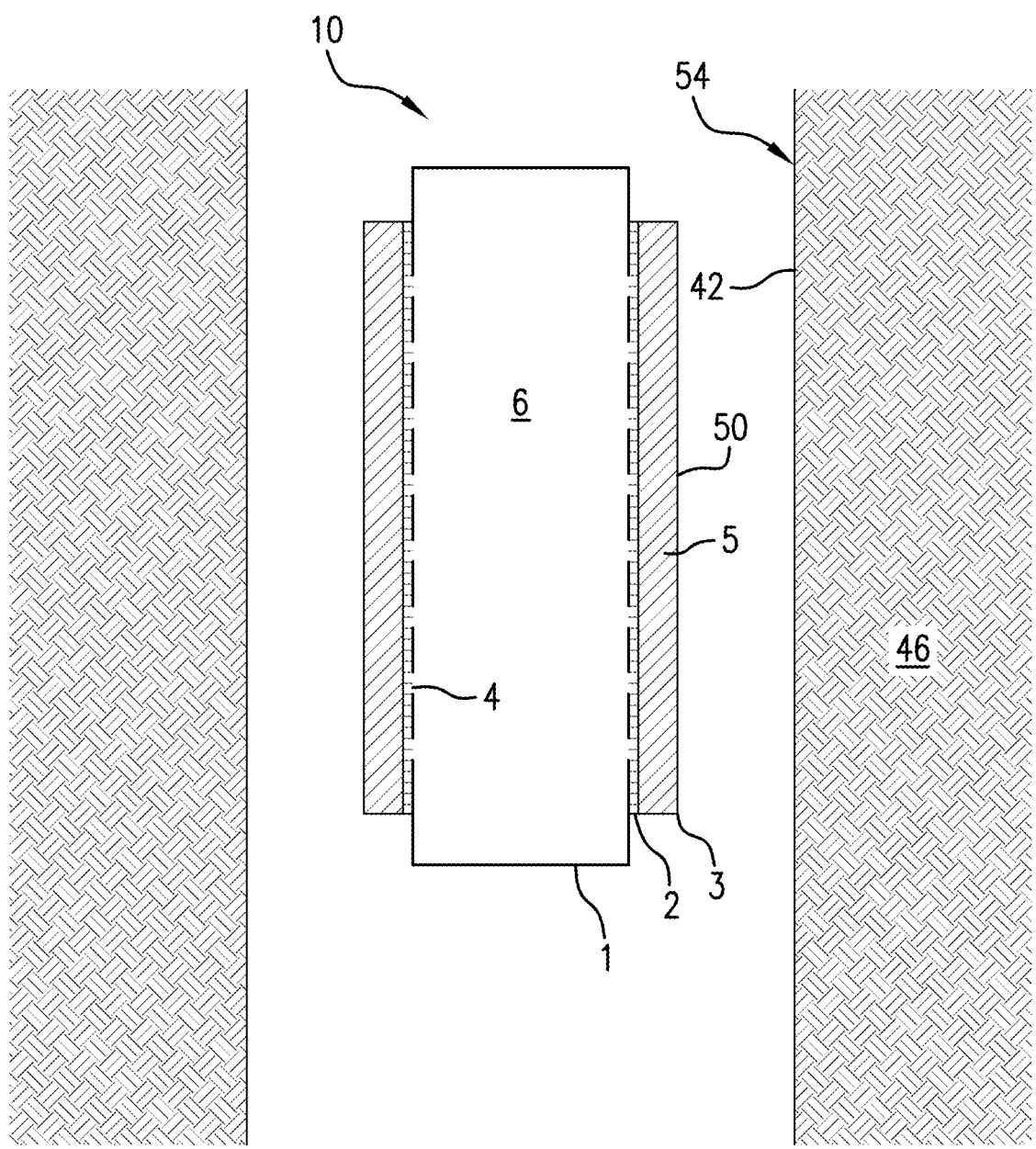
FIG. 3 is a sectional view of the apparatus of FIG. 2 positioned in a wellbore.

In FIG. 2 the embodiment of the porous and expandable filtration member 3 is employed in an apparatus 10 for a downhole hydrocarbon completion and/or recovery application. The filtration member 3 includes a body 5, which has a cylindrical shape and is positioned radially outwardly of a tubular member such as base pipe 1 that has holes 4 therethrough and illustrated herein as a perforated tubular. The filtration member 3 and the base pipe 1 are assembled and positioned within a borehole 42 in an earth formation 46, as illustrated in FIG. 3. The filtration member 3, as illustrated in FIGS. 2 and 3, is in the first position, which is also known as the run in position, wherein an outer surface 50 of the filtration member 3 is dimensioned radially smaller than a radial dimension of an inner surface 54 of the borehole 42. Once the filtration member 3 and base pipe 1 assembly are run into the borehole 42 and positioned at a desired location, the filtration member 3 can be contacted with a downhole fluid comprising water wherein the composite material changes shape, thereby expanding the body 5 of the filtration member 3 towards the second volume. The body 5 may not reach the second volume since contact with the inner surface 54 may prevent the volumetric expansion of the body 5 from continuing. Such contact is desirable and it allows fluid to flow through the formation 46 and be filtered by the filtration member 3 before flowing through the holes 4 and into the inside 6 of the base pipe 1.

Optionally, a screen 2 is disposed between the base pipe 1 and the porous and expandable filtration member 3. The screen 2 allows for additional control over final filtration properties. For example, by setting the filtration properties of the screen 2 finer than those of the body 3 the final filtration properties are established based primarily upon those of the screen 2.

Methods of making the porous and expandable filtration member are not particularly limited. Fillers, rubber binders, curing agents, the polymer hydrogels, and the optional components such as activators and accelerators as discussed herein can be mechanically blended in a planetary mixer or other type of applicable mixer. In an embodiment, the rubber binder is a liquid at room temperature, and the rubber binder is mixed with curing agents/accelerators/activators initially, then filler is added, followed by polymer hydrogel powder.

The blend can be cast/shaped/molded into any desired geometry. In an embodiment, the blend is cast at 120 to 180° C. for 30 to 180 min to form the filtration member. Several manufacturing technologies can be used for applying the filtration member 3 onto a base pipe 1 or screen 2 for making the apparatus for wellbore operations. Examples of the methods include hand lay-up, extrusion, compression molding and the like.

In use the apparatus can be disposed in a well penetrating a formation. The filtration member is then expanded towards the second volume upon contacting with a downhole fluid, such as a fluid containing water. The expanded filtration member conforms to a wellbore wall, for example, fills the annular space between the apparatus and the wellbore wall. Fluids can then be filtered through the filtration member to the tubular member.

Set forth below are various embodiments of the disclosure.

Embodiment 1. An apparatus comprising an expandable and porous filtration member having a body constructed of a composite comprising a polymer hydrogel, a rubber binder, and a filler, wherein the body has a first volume and expandable to a second volume upon contacting with a fluid comprising water.

Embodiment 2. The apparatus as in any prior embodiment, wherein the filler comprises a renewable raw material.

Embodiment 3. The apparatus as in any prior embodiment, wherein the filler comprises one or more of the following: wood particles; wood strands; wood chips; wood flakes; wood shavings; walnut shell fragments; or corn cob fragments.

Embodiment 4. The apparatus as in any prior embodiment, wherein the filler is present in an amount of about 40 volume percent to about 70 volume percent based on the first volume of the body.

Embodiment 5. The apparatus as in any prior embodiment, wherein the rubber binder comprises one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber.

Embodiment 6. The apparatus as in any prior embodiment, wherein the volume ratio of the filler relative to the rubber binder is about 10:1 to about 7:1.

Embodiment 7. The apparatus as in any prior embodiment, wherein the polymer hydrogel comprises a repeating unit derived from one or more of the following: an acrylate; an acrylic acid or a salt thereof; an acrylamide; a vinylpyrrolidone; a vinyl ester; a vinyl alcohol; a 2-acrylamide-2-methylpropanesulfonic acid; or a derivative thereof.

Embodiment 8. The apparatus as in any prior embodiment, wherein the polymer hydrogel is present in an amount of 15 to 50 wt. %.

Embodiment 9. The apparatus as in any prior embodiment, wherein the body of the expandable and porous filtration member filters fluid that passes therethrough.

Embodiment 10. The apparatus as in any prior embodiment, wherein the body of the expandable and porous filtration member is configured to fill an annular space when expanded toward the second volume.

Embodiment 11. The apparatus as in any prior embodiment, further comprising a tubular member having a fluid flow passage, wherein the expandable and porous filtration member is radially outwardly disposed of the tubular member.

Embodiment 12. The apparatus as in any prior embodiment, wherein the tubular member is perforated.

Embodiment 13. The apparatus as in any prior embodiment, further comprising a screen disposed between the tubular member and the expandable and porous filtration member.

Embodiment 14. A method of producing fluid from a wellbore, the method comprising: disposing an apparatus in a well penetrating a formation, the apparatus comprising a tubular member having a fluid flow passage, and an expandable and porous filtration member radially outwardly disposed of the tubular member, the expandable and porous filtration member having a body constructed of a composite comprising a polymer hydrogel, a filler; and a rubber binder; the body having a first volume and expandable to a second volume; expanding the expandable and porous filtration member towards the second volume; and filtering a fluid through the expanded filtration member to the tubular member.

Embodiment 15. The method as in any prior embodiment, wherein expanding the expandable and porous filtration member comprises contacting the expandable and porous filtration member with a fluid comprising water.

Embodiment 16. The method as in any prior embodiment, wherein the filler is present in an amount of about 40 volume % to about 70 volume % based on the first volume of the body.

Embodiment 17. The method as in any prior embodiment, wherein the filler comprises one or more of the following: wood particles; wood strands; wood chips; wood flakes; wood shavings; walnut shell fragments; or corn cob fragments.

Embodiment 18. The method as in any prior embodiment, wherein the rubber binder comprises one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber, and the volume ratio of the filler relative to the rubber binder is about 10:1 to about 7:1.

Embodiment 19. The method as in any prior embodiment, wherein the polymer hydrogel comprises a repeating unit derived from one or more of the following: an acrylate; an acrylic acid or a salt thereof; an acrylamide; a vinylpyrrolidone; a vinyl ester; a vinyl alcohol; a 2-acrylamide-2-methylpropanesulfonic acid; or a derivative thereof, and the polymer hydrogel is present in an amount of 15 to 50 wt. %.

Embodiment 20. A method of completing a wellbore, the method comprising: disposing an apparatus in a well penetrating a formation, the apparatus comprising a tubular member having a fluid flow passage, and an expandable and porous filtration member radially outwardly disposed of the tubular member, the expandable and porous filtration member having a body constructed of a composite comprising a polymer hydrogel, a filler; and a rubber binder; the body having a first volume and expandable to a second volume; expanding the expandable and porous filtration member towards the second volume; and conforming the expanded filtration member to a wellbore wall.

Embodiment 21. A method of manufacturing the expandable and porous filtration member as in any prior embodiment, the method comprising: mechanically blending the polymer hydrogel, the rubber binder, the filler, optionally a curing agent, and optionally an accelerator to form a blend; and casting the blend to form the expandable and porous filtration member.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An apparatus comprising an expandable and porous filtration member having a body constructed of a composite comprising a polymer hydrogel, a rubber binder, and a filler, wherein the body has a first volume and expandable to a second volume upon contacting with a fluid comprising water, the filler comprises one or more of the following: wood particles; wood strands;
    wood chips; wood flakes; wood shavings; walnut shell fragments; or corn cob fragments; and
    wherein the body of the expandable and porous filtration member filters fluid that passes therethrough.

2. The apparatus of claim 1, wherein the filler comprises a renewable raw material.

3. The apparatus of claim 1, wherein the filler is present in an amount of about 40 volume percent to about 70 volume percent based on the first volume of the body.

4. The apparatus of claim 1, wherein the rubber binder comprises one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber.

5. The apparatus of claim 1, wherein the volume ratio of the filler relative to the rubber binder is about 10:1 to about 7:1.

6. The apparatus of claim 1, wherein the polymer hydrogel is a crosslinked polymeric material having a three-dimensional network, and the polymer hydrogel comprises a repeating unit derived from one or more of the following: an acrylate; an acrylic acid or a salt thereof, an acrylamide; a vinylpyrrolidone; a vinyl ester; a vinyl alcohol; a 2-acrylamide-2-methylpropanesulfonic acid; or a derivative thereof.

7. The apparatus of claim 6, wherein the polymer hydrogel comprises a plurality of crosslinks derived from a crosslinker comprising a di(meth)acrylamide of a diamine, a $C_{1-8}$ alkylene bisacrylamide, an N-methylol compounds of an unsaturated amide, a (meth)acrylate ester of a di-, tri-, or tetrahydroxy compound, a divinyl or diallyl compound, alkoxylated allyl(meth)acrylate, diallylamide of 2,2'-azobis (isobutyric acid), triallyl cyanurate, triallyl isocyanurate, maleic acid diallyl ester, a polyallyl ester, a tetraallyloxyethane, a triallylamine, a tetraallylethylene diamine, a polyol, a hydroxyallyl or acrylate compound, or an allyl ester of phosphoric acid or phosphorous acid.

8. The apparatus of claim 1, wherein the polymer hydrogel is present in an amount of 15 to 50 wt. %.

9. The apparatus of claim 1, wherein the body of the expandable and porous filtration member filters fluid that passes therethrough.

10. The apparatus of claim 1, wherein the body of the expandable and porous filtration member is configured to fill an annular space when expanded toward the second volume.

11. The apparatus of claim 1, further comprising a tubular member having a fluid flow passage, wherein the expandable and porous filtration member is radially outwardly disposed of the tubular member.

12. The apparatus of claim 11, wherein the tubular member is perforated.

13. The apparatus of claim 11, further comprising a screen disposed between the tubular member and the expandable and porous filtration member.

14. A method of producing fluid from a wellbore, the method comprising:
disposing the apparatus of claim 1 in a well penetrating a formation;
expanding the expandable and porous filtration member towards the second volume; and
filtering a fluid through the expanded filtration member to the tubular member.

15. The method of claim 14, wherein expanding the expandable and porous filtration member comprises contacting the expandable and porous filtration member with a fluid comprising water.

16. The method of claim 14, wherein the filler is present in an amount of about 40 volume % to about 70 volume % based on the first volume of the body.

17. The method of claim 14, wherein the rubber binder comprises one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber, and
the volume ratio of the filler relative to the rubber binder is about 10:1 to about 7:1.

18. The method of claim 14, wherein the polymer hydrogel comprises a repeating unit derived from one or more of the following: an acrylate; an acrylic acid or a salt thereof; an acrylamide; a vinylpyrrolidone; a vinyl ester; a vinyl alcohol; a 2-acrylamide-2-methylpropanesulfonic acid; or a derivative thereof, and
the polymer hydrogel is present in an amount of 15 to 50 wt. %.

19. A method of completing a wellbore, the method comprising:
disposing the apparatus of claim 1 in a well penetrating a formation;
expanding the expandable and porous filtration member towards the second volume; and
conforming the expanded filtration member to a wellbore wall.

20. A method of manufacturing the expandable and porous filtration member of claim 1, the method comprising:
mechanically blending the polymer hydrogel, the rubber binder, the filler, optionally a curing agent, and optionally an accelerator to form a blend; and
casting the blend to form the expandable and porous filtration member.

21. The apparatus of claim 1, wherein the filler has an irregular shape.

22. The apparatus of claim 1, wherein the filler forms a porous mainframe and imparts permeability to the body due to its morphology.

23. The apparatus of claim 1, wherein the polymer hydrogel is a polyacrylamide having crosslinks derived from polyethylene glycol diacrylate; a polyacrylic acid homopolymer or copolymer having crosslinks derived from vinyl ester oligomer; a copolymer of acrylic acid and an acrylate having crosslinks derived from polyethylene glycol diacrylate; or a crosslinked polyethylene oxide.

* * * * *